(12) United States Patent
Shutt et al.

(10) Patent No.: US 7,656,127 B1
(45) Date of Patent: Feb. 2, 2010

(54) METHOD AND APPARATUS FOR USING AN EXTERNAL RESISTOR FOR CHARGING APPLICATIONS

(75) Inventors: James H. Shutt, Lynnwood, WA (US); Warren S. Snyder, Snohomish, WA (US)

(73) Assignee: Cypress Semiconductor Corporation, San Jose, CA (US)

( * ) Notice: Subject to any disclaimer, the term of this patent is extended or adjusted under 35 U.S.C. 154(b) by 338 days.

(21) Appl. No.: 11/711,966

(22) Filed: Feb. 27, 2007

Related U.S. Application Data

(60) Provisional application No. 60/777,419, filed on Feb. 27, 2006.

(51) Int. Cl.
*H01M 10/46* (2006.01)
(52) U.S. Cl. ...................................... 320/134

(58) Field of Classification Search ................. 320/107, 320/128, 132, 134, 136
See application file for complete search history.

(56) References Cited

U.S. PATENT DOCUMENTS

| | | | |
|---|---|---|---|
| 6,140,928 A * | 10/2000 | Shibuya et al. ............. 320/134 |
| 7,099,168 B2 * | 8/2006 | Fukumoto .................... 363/98 |
| 2006/0255768 A1* | 11/2006 | Yoshio ........................ 320/134 |
| 2007/0190369 A1* | 8/2007 | Leach et al. .................. 429/9 |

* cited by examiner

*Primary Examiner*—Edward Tso

(57) ABSTRACT

A device using a single external resistor for battery charging applications and a software current feedback control loop for use with the external resistor is described. For instance, a single resistor can be used to determine the charge electrical current level being used to charge a battery. The determined level from the single resistor can be used in a feedback loop to set the charge electrical current level and to determine if there is an over current condition requiring the charge current be shut down.

20 Claims, 6 Drawing Sheets

METHOD AND APPARATUS FOR USING AN EXTERNAL RESISTOR FOR CHARGING APPLICATIONS

RELATED APPLICATIONS

This application claims the benefit of U.S. Provisional Application Ser. No. 60/777,419, filed Feb. 27, 2006, which is hereby incorporated by reference.

TECHNICAL FIELD

The present invention relates generally to microcontrollers and, more particularly, to battery charging applications.

BACKGROUND

Processing devices, for example, microcontrollers, are widely used in the industry as control elements in many solutions. Most microcontrollers are general in purpose, and are designed for use in a wide variety of applications. One such application is battery charging. Rechargeable batteries are used in many applications to power a variety of electronic devices (e.g., cell phones, laptop computers, personal digital assistants (PDAs), small electronic devices, and the like). Battery charging functionality may be realized on or using a microcontroller, for example, programmable system on a chip device (e.g., a PSoC® device manufactured by Cypress Semiconductor Corporation of San Jose, Calif.), which allows designers to build very small portable devices and to fit the electronics into a small battery package.

Certain types of batteries, for example, Lithium-based (Li+) batteries, are very sensitive to the charge voltage, current and discharge time. Therefore, they require a protective circuit. The protective circuit protects the battery from overcharge and over-discharge, and limits the load and charge current to safe values.

In one conventional programmable system on a chip device, separate resistors are utilized in the protective circuit for selecting the battery charger's charging current and its over-current shutdown level. On disadvantage of such a configuration is that it requires the use of additional pins on the device. Another disadvantage is that the system has to be pre-programmed for a particular charging current, thereby, no flexibility is provided.

BRIEF DESCRIPTION OF THE DRAWINGS

The present invention is illustrated by way of example and not limitation in the figures of the accompanying drawings, in which.

DETAILED DESCRIPTION

Figure 1A:
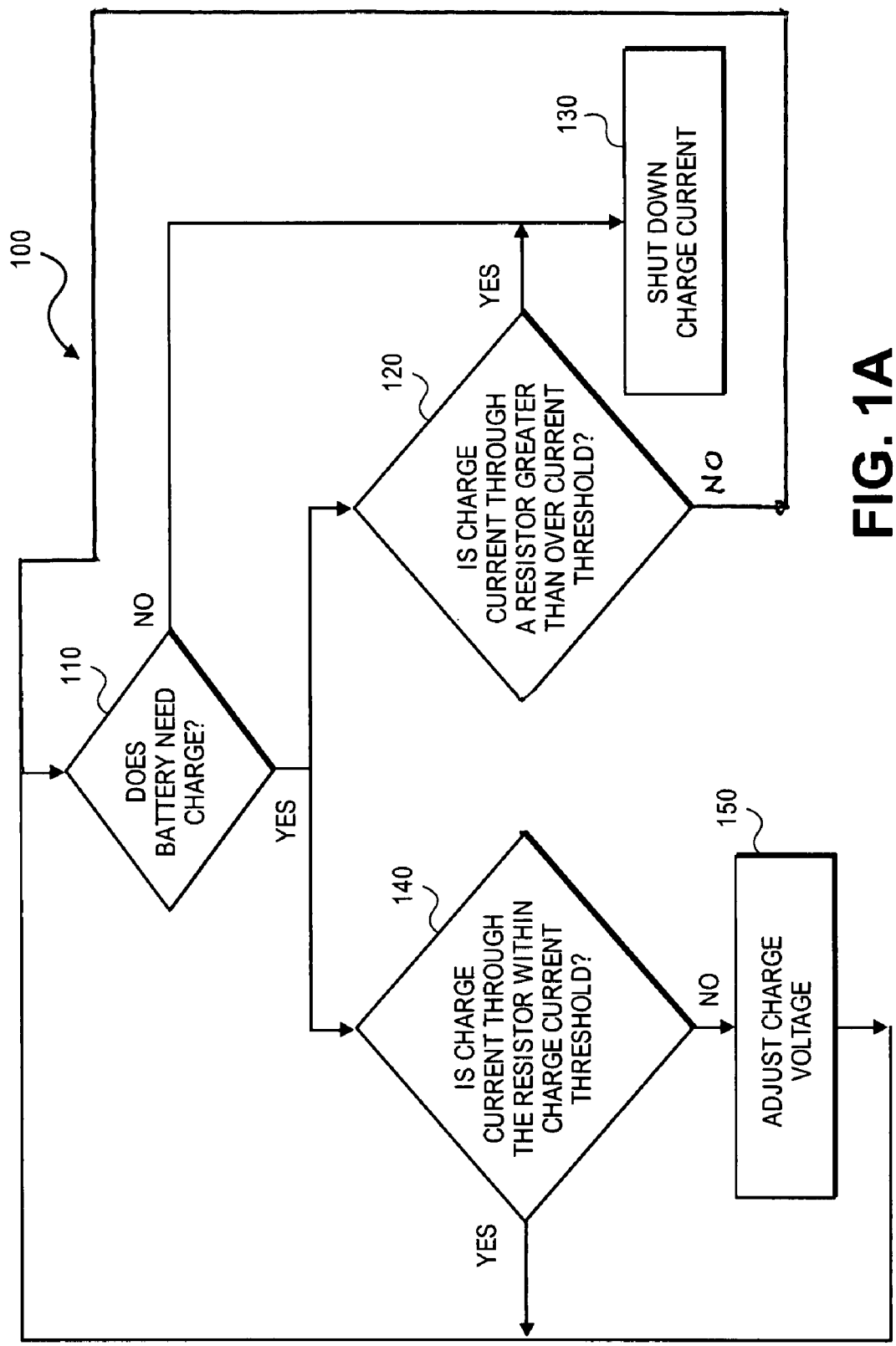
FIG. 1A illustrates one embodiment of a flow diagram for charging a battery using a control loop having a single resistor to set the charge current and monitor an over-current condition.

In the following description, for purposes of explanation, numerous specific details are set forth in order to provide a thorough understanding of the present invention. It will be evident, however, to one skilled in the art that the present invention may be practiced without these specific details. In other instances, well-known circuits, structures, and techniques are not shown in detail or are shown in block diagram form in order to avoid unnecessarily obscuring an understanding of this description.

Reference in the description to "one embodiment" or "an embodiment" means that a particular feature, structure, or characteristic described in connection with the embodiment is included in at least one embodiment of the invention. The appearances of the phrase "in one embodiment" in various places in the specification do not necessarily all refer to the same embodiment.

A method and apparatus for using a single external resistor for charging applications and a software current feedback control loop for use with the external resistor is described. In one embodiment, an external resistor is used to simultaneously set the charge current and monitor the over-current shutdown for a battery charger. A single resistor may perform two functions instead of using two resistors. For instance, a single resistor can be used to determine the current (e.g., the electrical "charge" current level) being used to charge a battery, for example, by using a sensor attached between the resistor and ground to measure or sense the voltage across the resistor to determine the current (e.g., current level or amount) received by the resistor from the battery (e.g., the current flowing through the resistor). The determined current level from the single resistor can be used in a feedback loop to set the charge current and to determine if there is an over current condition requiring the charge current be shut down. In some embodiments, setting the charge current may include adjusting the current and/or charge voltage by predetermined amounts until the charge current is as close as possible to a single current level or within a range of current levels (e.g., a predetermined threshold level or range).

In addition, for single resistor embodiments, a single input/output (I/O) may be utilized to perform two functions instead of using two I/O's (i.e., one for each function). Specifically, a single I/O external pin or contact may be used to couple the single external resistor to a chip containing software and/or circuitry of embodiments of the apparatus. In one embodiment, thresholds are programmed into the current sensing algorithm to respond to a predefined input level for regulation (e.g., setting the charge current level) and over-current trip events (e.g., shutting down the charge current if an overcurrent is detected). For instance, a single resistor embodiment (e.g., control loop, system, or controller) may be more easily programmed and configured for charging different voltage "size" batteries (e.g., setting and/or programming different charge currents and over current thresholds) than systems using two resistors.

The resistor may be external by being attached to an external pin or contact of a "controller", for example a microcontroller, a microcontroller unit (MCU), or a programmable system on a chip device (e.g., a PSoC® device manufactured by Cypress Semiconductor Corporation of San Jose, Calif.). The controller may include one or more sub-systems, for example, a controller sub-system, a power block sub-system, a current feedback loop subsystem, a voltage feedback sub-system, a reference sub-system, and the like.

It should be noted that although the apparatus and methods may be described herein in relation to a controller (e.g., a programmable system on a chip device) or controller sub-system for ease of explanation, the apparatus and methods described herein may be applied to the development of other devices (e.g., non-programmable controllers or controller sub-systems configured for charging only one size battery, systems that are not entirely on a chip, and/or systems including other types of devices such as application specific integrated circuits (ASIC)).

According to embodiments, the terms "voltage" or "current" may represent one or more levels (e.g., a value, amount, or signal amplitude) of voltage or current respectively. For example, a voltage may be a voltage level across (e.g., between a first terminal and second terminal or end) a resistor, an electronic device or a circuit component. Also, a voltage may be a voltage level between (e.g., between a first terminal electrically away from ground) a resistor, an electronic device or a circuit component and ground. Moreover, a current may be a current level received at or flowing through (e.g., between a first terminal and second terminal or end) a resistor, an electronic device or a circuit component.

For instance, a voltage level may be measured (e.g., read, sensed, detected, sampled, or the like) by a hardware circuit (e.g., voltage sensor, for example, an analog to digital converter (ADC) coupled to an end or pin of the resistor electronically "away" from ground) measuring a voltage between a pin and ground, or across a device. Moreover, a current level received by or flowing through the resistor may be determined by, according to, or based on the measured voltage level, for example, by a controller sub-system (e.g., a sub-system of a controller acting or functioning at least as a current sensor and/or voltage sensor) receiving an output or measurement of the voltage sensor (e.g., by performing the calculation, current=voltage/resistance). In some embodiments, the voltage measurement or current determination may be "read", received, or "made" by a controller sub-system that measures, reads, or receives an output signal based on or proportional to the measurement, from the hardware circuit (e.g., and ADC) measuring the level at or across a resistor. The controller sub-system may include a software program and/or firmware to receive the measurement (or output signal), to determine current, and to control other devices (e.g., circuitry) based on the received measurement and/or determined current.

Such measurements and/or determinations may be performed continuously, periodically, or otherwise scheduled by the controller sub-system. For example, a controller sub-system may include one or more software applications running on a processor, electronic devices, hardware circuitry, ADCs, firmware, digital to analog converters (DACs), and the like. Note that "pins", as described herein may represent external pins or contacts of a chip for electrically attaching, soldering, connecting, or coupling circuitry and/or devices of the chip to external components. For example, pins may be used to couple electrical signals between circuitry of or on the chip and external components, transistors, voltage sources, current sources, batteries, resistors and/or the like. Moreover, a "chip" may describe a controller, a microcontroller, a microcontroller unit (MCU), a programmable system on a chip device, a die, an integrated circuit (IC), and/or a single monolithic semiconductor substrate.

FIG. 1A illustrates one embodiment of a flow diagram for charging a battery using a control loop having a single resistor to set the charge current and monitor an over-current condition. FIG. 1A shows process 100 for example, a process for charging a battery using a battery charge control loop, apparatus, system, or method as described herein. For example, at block 110, it is determined whether or not the battery needs charging. Block 110 may include circuitry to measure a voltage output of a battery, for example, to determine if a battery has a voltage output below a certain threshold, thus, identifying that the battery should be charged or recharged. In some embodiments, block 110 may include determining that a battery that is not yet being charged needs charging (e.g., charging is to be initiated from a minimal batter voltage and a zero charge current). If at block 110 it is determined that the battery does not need charging, the process continues to block 130 where any charge current supplied or input to the battery is shut down. In some embodiments, block 130 may represent a "status quo" process, for example, where the battery is not being charged and continues not to be charged because its voltage output is above a "requires charging" threshold. Alternatively, in some situations, block 130 may represent discontinuing or shutting down a charge current that presently exists or is being received by the battery to charge the battery.

Alternatively, if at block 110 it is determined that the battery does need charging, the process continues and is forked to block 120 and to block 140. At block 120, it is determined whether or not a charge current through a resistor is greater than an over-current threshold. For example, the charge current of block 120 may be a current level through, received at, supplied to, or at a terminal of a battery, to charge the battery. Moreover, the charge current may be determined (e.g., based on a voltage measured or sensed) by a single external resistor coupled to a second terminal of the battery. For example, the resistor may be coupled between the second terminal of the battery and ground. In some embodiments, the charge current may be determined by a sensor which measures a voltage drop across the resistor, for example, to determine the battery charge current. In some embodiments, all, or substantially all of the charge current flowing through the battery flows through the resistor as well.

Moreover, in some embodiments, block 120 may include initiating a charge current through the battery and resistor, for example, where prior to block 110 the battery was not being charged or no charge current existed through the battery or resistor. Alternatively, in other embodiments, at block 120, the current already exists through the resistor.

If at block 120 the charge current through the resistor (e.g., based on a voltage measurement) is greater than an over-current threshold (e.g., a value to be compared to a voltage measurement), the process continues to block 130 where the charge current is shut down. Shutting down the charge current may include discontinuing, stopping, turning off, terminating, or creating an open circuit for the battery charge current, for example, by reducing the voltage supplied to a gate of a transistor to below a threshold voltage to discontinue or switch off the transistor through which the charge current flows.

Alternatively, if at block 120 it is determined that the charge current through the resistor is not greater than the over-current threshold, the process for this fork returns to block 110.

At block 140, it is determined whether the charge current through the same resistor as that of block 120 is within a charge current threshold. Block 140 may include determining whether the charge current is above, below, or within a charge current threshold range. Block 140 may include determining whether the charge current is above an upper current threshold (e.g., greater than an upper value or limit) of a range or below a lower current threshold (e.g., less than a lower value or limit) of the range. According to embodiments, block 140 may include determining the charge current flowing through a single external resistor, for example, using a sensor, as described for block 120.

If at block 140 it is determined that the charge current is within the current threshold, the process for this fork returns to block 110, such as to allow the determined current level to be maintained or unaltered at the current level. For example, the process may return to block 110 as described above for blocks 110, 120 and 130 where the battery is already being charged.

Alternatively, if at block 140 it is determined that the charge current (e.g., based on a voltage measurement) is not within the charge current threshold (e.g., a value to be compared to a voltage measurement), the process continues to block 150. At block 150 the charge current is adjusted or "set". For example, block 150 may include increasing or decreasing the charge current to cause the charge current to be equal to or within a charge current threshold range. Block 150 may include increasing or decreasing the charge current for example, where the charge current is below or above a charge current threshold level (such as a threshold range) to cause the charge current to be closer to that level, for example, by changing a charge voltage input to the battery, according to a feedback loop that measures the charge current.

After block 150, the process returns to block 110. Similar to the description for block 140, when the process returns to block 110, the processes for blocks 110 through 130 may include descriptions above for continuing charging of a battery.

According to embodiments, block 150 may include increasing a charge voltage level to a battery (e.g., increasing a charge voltage at a terminal of the battery away from ground) if or when the charge current (e.g., determined charge current through a resistor) drops below a lower current threshold (e.g., less than a lower value or limit) of a charge current threshold range. Also, block 150 may include decreasing a charge voltage level to a battery (e.g., decreasing a charge voltage at a terminal of the battery away from ground) if or when the charge current (e.g., determined charge current through a resistor) increases above an upper current threshold (e.g., greater than an upper value or limit) of the charge current threshold range.

In some embodiments, block 150 may include adjusting the charge voltage, such as by predetermined step magnitudes and/or a sequence of predetermined step magnitudes. Specifically, block 150 may include adjusting the charge voltage (which may adjust the charge current as well) up or down by a predetermined "step" amount for each increase or decrease. This predetermined amount may be constant, or may vary linearly or nonlinearly with respect to the difference between the charge current and the charge current threshold. In some embodiments, the amount of adjustment may be reduced, as the charge current gets closer to the charge current threshold, for example, by using adjustments according to a feedback control loop, or the like.

In some embodiments, for a battery that is not yet being charged (e.g., charging is to be initiated from a minimal charge voltage and zero charge current) block 150 may include "ramping up" the charge current and/or charge voltage, such as by predetermined step magnitudes and/or a sequence of predetermined step magnitudes. The predetermined step magnitudes and/or a sequence of predetermined step magnitudes for ramping up may or may not be the same as those for a battery already being charged.

Figure 1B:
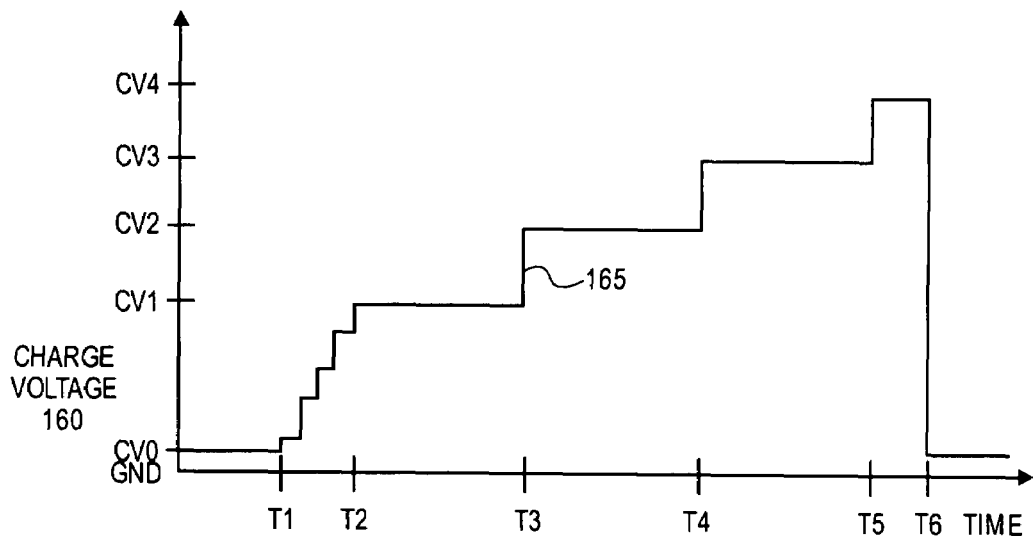
FIG. 1B is a graph showing charge voltage with respect to time for an example of charging a battery according to embodiments described herein.
Figure 1C:
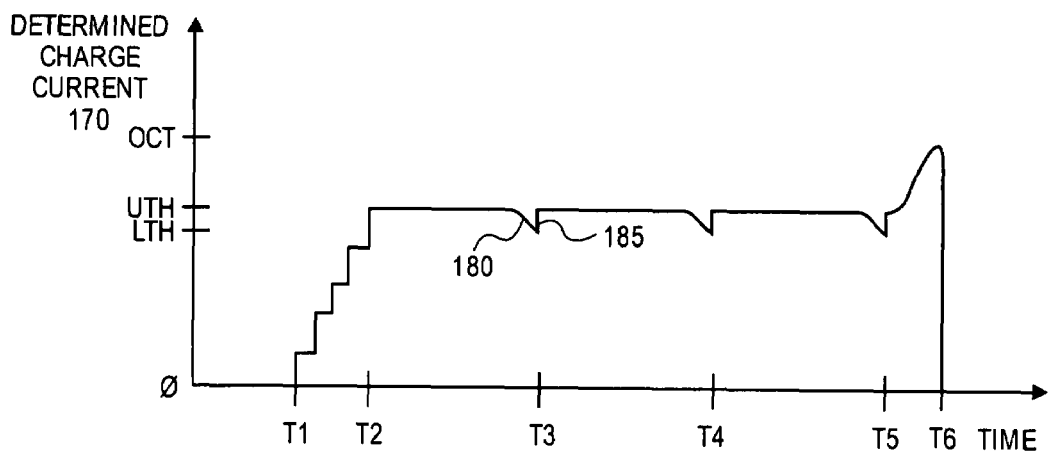
FIG. 1C is a graph showing determined charge current with respect to time for an example of charging a battery according to embodiments described herein.

For example, FIG. 1B is a graph showing charge voltage 160 (e.g., see voltage Vy of FIG. 2) with respect to time (Time) for an example of charging a battery according to embodiments described herein. Correspondingly, FIG. 1C is a graph showing determined charge current 170 (e.g., see current 270 of FIG. 2) with respect to time (Time) for an example of charging a battery according to embodiments described herein. Current 170 may correspond to voltage 160 over time, for example as a typical charging voltage and current for embodiments described herein. Also, current 170 and voltage 160 may show examples of adjusting a charge voltage at block 150.

For instance, at time T1 it may be determined that a battery that is not yet being charged, needs charged (e.g., charging is to be initiated from minimal charge voltage CV0 and zero charge current) (see block 110, also there is not over-current at block 120). Between time T1 and time T2, the charge voltage (and corresponding charge current) are ramped up (such as by predetermined steps at block 150, by cycling through blocks 110, 120, 140 and 150) until charge current 170 reaches lower threshold LTH. At time T2 charge current 170 reaches or exceeds LTH, and adjusting/increasing charge voltage is discontinued (this cycle, goes from block 140 to block 110). At time T2 the charge current may also exceeds upper threshold UTH, and if so, the charge voltage is decreased to below UTH (next cycle, goes from block 140 to block 150, next cycle may go from block 140 to block 110).

Between time T2 and time T3, charge voltage 160 remains level, constant and/or steady at voltage CV1 (e.g., cycling through blocks 110, 120, 140 and back to 110). However, the charge current may drop off as the batter charges. For example, FIG. 1C shows current drop 180 prior to time T3. At drop 180 charge current 170 drops below (e.g., to be less than) lower threshold LTH (e.g., a threshold range, such as between LTH and UTH, or a "threshold"). In response, or as a result, charge voltage 160 is increased (e.g., cycling through blocks 110, 120, 140 and 150) until charge current 170 is greater than LTH, and adjusting/increasing charge voltage is discontinued (this cycle, goes from block 140 to block 110). Similar to descriptions above for time T2, the charge current may be adjusted to be greater than UTH at time T3 and be adjusted downward. For example, FIG. 1B shows voltage increase 165 after or in response to current drop 180 and prior to or approximately at time T3.

Correspondingly, FIG. 1C shows current increase 185 after drop 180 and prior to or approximately at time T3 (e.g., in response to voltage increase 165). After voltage increase 165, charge voltage 160 remains level, constant and/or steady at voltage CV2 (e.g., cycling through blocks 110, 120, 140 and back to 110). However, again, the charge current may drop off as the batter charges (e.g., the resistance of the battery may increase). For example, the same charge voltage increase process described above prior to and at Time T3 may occur again at prior to and at time T4. However, at Time T4, charge voltage 160 is increased to voltage CV3. In some embodiments, the same process described above prior to and at Time T3 and T4 may continue, increasing the charge voltage by increments whenever the charge current drops below LTH, until the battery is charged (not shown)(e.g., at block 110 it is determined that the battery does not required further charging).

Alternatively, FIG. 1C also shows current increase 185 prior to Time T6. As a result or in response to increase 185 exceeding or being greater than over-current threshold OCT at Time T6, charge voltage 160 is shut down (e.g., charge current 170 to the battery is shut down or reduced to zero). According to embodiments, OCT may be above UTH by a percentage in a range of between 20 percent and 50 percent of UTH.

In addition, embodiments of the invention include processes occurring before block 110. For example, prior to block 110 a battery charger control loop may be assembled, for example, by assembling a single external resistor to a pin of circuitry, where the resistor is used to determine the charge current referred to in process 100. Also, assembly may include programming a controller and/or controller sub-system according to the value of the resistor, a predetermined charge current threshold, and/or a predetermined over-current threshold. It is also considered that prior to assembly, a battery type, size (e.g., voltage), charge current, and/or over-current threshold may be identified or predetermined, for example, as information to be considered in order to pre-determine, program or tailor a battery charge control loop or system to be used to charge the predetermined battery. In some embodiments, predetermining a charge current threshold or programming as described above may include predetermining a step magnitude or sequence of step magnitudes for adjusting (e.g., increasing and decreasing) the "ramp up" charge voltage and/or charge current at block 150.

Figure 2:
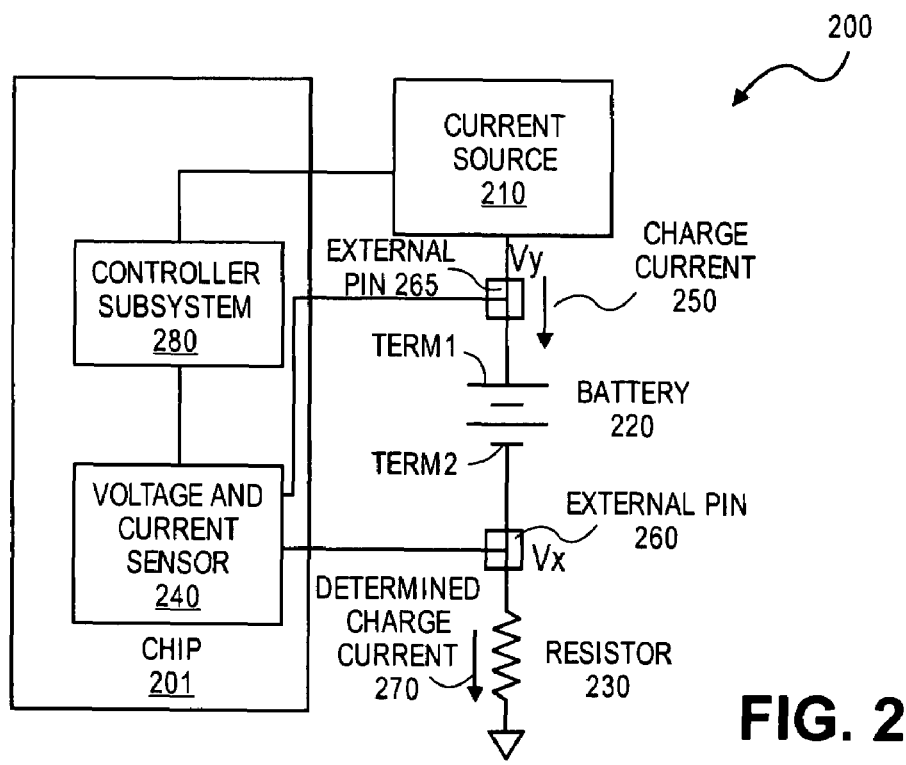
FIG. 2 illustrates one embodiment of a battery charge control loop

FIG. 2 illustrates one embodiment of a battery charge control loop. FIG. 2 shows control loop 200 including current source 210 coupled to battery 220 which is coupled to resistor 230 and current and voltage sensor 240 (e.g., to sense one or more currents and/or voltages). Battery 220 may be coupled to current source and/or chip 201 at external pin 265. Battery may also be coupled to resistor 230 and/or chip 201 at external pin 260. Voltage $V_Y$ is shown at pin 365 (e.g., at terminal TERM 1), for example, as the voltage between battery 220 and ground. Voltage $V_X$ is shown at pin 260 (e.g., at terminal TERM 2), for example, as the voltage between resistor 230 and ground. Current and voltage sensor 240 is coupled in a feedback loop to controller sub-system 280, which is coupled to current source 210. For example, controller sub-system 280 may be a control sub-system of a microcontroller or of a programmable system on a chip device. Specifically, FIG. 2 shows controller sub-system 280 and sensor 240 as part of chip 201, which may be a single MCU or a single programmable system on a chip device. Controller sub-system 280 may control the current level of charge current 250, output by current source 210, for example, according to the current level of determined current 270 flowing through resistor 230 and determined by current and voltage sensor 240. For example, sensor 240 may be described as a "voltage sensor" by sensing the "charge voltage" or voltage Vy. In addition, sensor 240 may be described as a "current sensor" by sensing voltage Vx to determine the "charge current" or current 270.

Current source 210 may generate or provide charge current 250, for example, a current for charging battery 220. All or substantially all of charge current 250 may enter battery 220, exit battery 220 and pass through resistor 230 to ground. In other words, none or substantially none of charge current 250 may enter current and voltage sensor 240.

Battery 220 may be a rechargeable battery, for example, a lithium ion, lithium, and the like. Battery 220 may be an "external" battery, for example, by being coupled to external pins of a chip, charge control loop or charging system. Battery 220 is shown having terminal (TERM) 1 towards or receiving charge current 250 from source 210; and terminal (TERM) 2 towards or sending charge current 270 to be received by resistor 230.

In some embodiments, current source 210 may be a current source controllable by controller sub-system 280 and/or current and voltage sensor 240. For example, controller sub-system 280 and/or current and voltage sensor 240 may be able to adjust the amount or level of current output by current source 210 (e.g., to provide charge voltage Vy, to set, maintain or adjust the charge current 250). Moreover, current and voltage sensor 240 may control current source 210 by shutting off or discontinuing charge current 250. Thus, in some embodiments, current and voltage sensor 240 may include a controller sub-system (e.g., include sub-system 280) to control current source 210.

Resistor 230 may be a discrete resistor, or resistor formed in a substrate, for example, a silicon substrate. For example, FIG. 2 shows external pin 260 for example, a pin or contact of a chip, die, IC, or single monolithic semiconductor substrate. Resistor 230 may be an "external" resistor, for example, by being coupled to one or more external pins of chip 201, charge control loop or charging system. Thus, resistor 230 may be coupled to pin 260, for example, by being soldered to pin 260 or the like. Similarly, in some embodiments, battery 220 may be "external" to chip 201. Moreover, battery 220 may be coupled, attached or soldered to chip 201 (e.g., by attaching or soldering TERM 1 to external pin 265 and TERM 2 to external pin 260) In some embodiments, source 210 (or some components of source 210) may be "external" to chip 201.

Sensor 240 may determine determined charge current 270 flowing through (e.g., received by or flowing through) resistor 230 according to a voltage measured across resistor 230. As noted above, determined charge current 270 may be equal to or substantially equal to current 250. In some embodiments, current and voltage sensor 240 may be coupled between terminal TERM 2 of battery 220 and/or pin 260 and ground. Thus, current and voltage sensor 240 may measure the voltage across resistor 230, which is also coupled between terminal TERM 2 and/or pin 260 and ground, to determine current 270. Specifically, current 270 may be equal to the voltage across resistor 230 divided by the value or resistance (e.g., the impedance) of resistor 230.

Current and voltage sensor 240 may measure the battery charge current (e.g., current 270 and/or 250) flowing though resistor 230. The sensor may measure this current by measuring voltage Vx; the voltage across the resistor or between the resistor and ground; and/or the voltage at external pin 260 or between the pin and ground. Moreover, current source 210 may generate battery charge current 250 (and/or charge voltage Vy) according to a signal from controller sub-system 280. For example, controller sub-system 280 may set current 250 (and/or charge voltage Vy) based on measured or determined current 270 and monitor an over-current condition based on current 270.

According to embodiments, loop 200 may be a current feedback and/or control loop that can be configured and/or programmed to control charge currents of various different levels or magnitudes (e.g., to charge various different sized batteries). For instance, the charge current and the value of resistor 230 can be changed, so that the voltage across resistor 230 is kept the same (e.g., if the voltage across resistor 230 does not change because the resistor value of resistor 230 changes based on the various different current levels). Such a loop can be controlled, embodied or implemented using a single MCU or a single programmable system on a chip device to change the chip to charge different battery sizes. For example, different charge current level can be used to charge a different size battery by changing the external resistor value and a software program (e.g., of the MCU), without changing voltage Vx, or hardware of the single MCU or programmable system on a chip device.

According to embodiments, the charge current is determined by the selection of Resistor 230 and the Controller Subsystem 280. The table below shows how the charge current can set to different values by choosing 1 of 3 controller algorithms (firmware and/or a machine accessible medium programmed with machine executable instructions) and selecting the value for Resistor 230. For example, if a 0.1 Ohm resistor is chosen along with controller algorithm 2, the charge current will be set to 1 A. If a charge current of 0.5 A is desired, Resistor 230 could be selected to be 0.2 Ohm using algorithm 2 or alternatively, Resistor 230 could be selected to be 0.1 Ohm using algorithm 3. This also allows the voltage at Vx to be set to different values (Vx=(charge current)(Resistor 230)).

| Resistor 230 Controller Subsystem 280 | 0.1 Ohm | 0.2 Ohm |
|---|---|---|
| algorithm 1 (Vx = 200 mV) | 2.0 A | 1.0 A |
| algorithm 2 (Vx = 100 mV) | 1.0 A | 0.5 A |
| algorithm 3 (Vx = 50 mV) | 0.5 A | 0.25 A |

Figure 3:
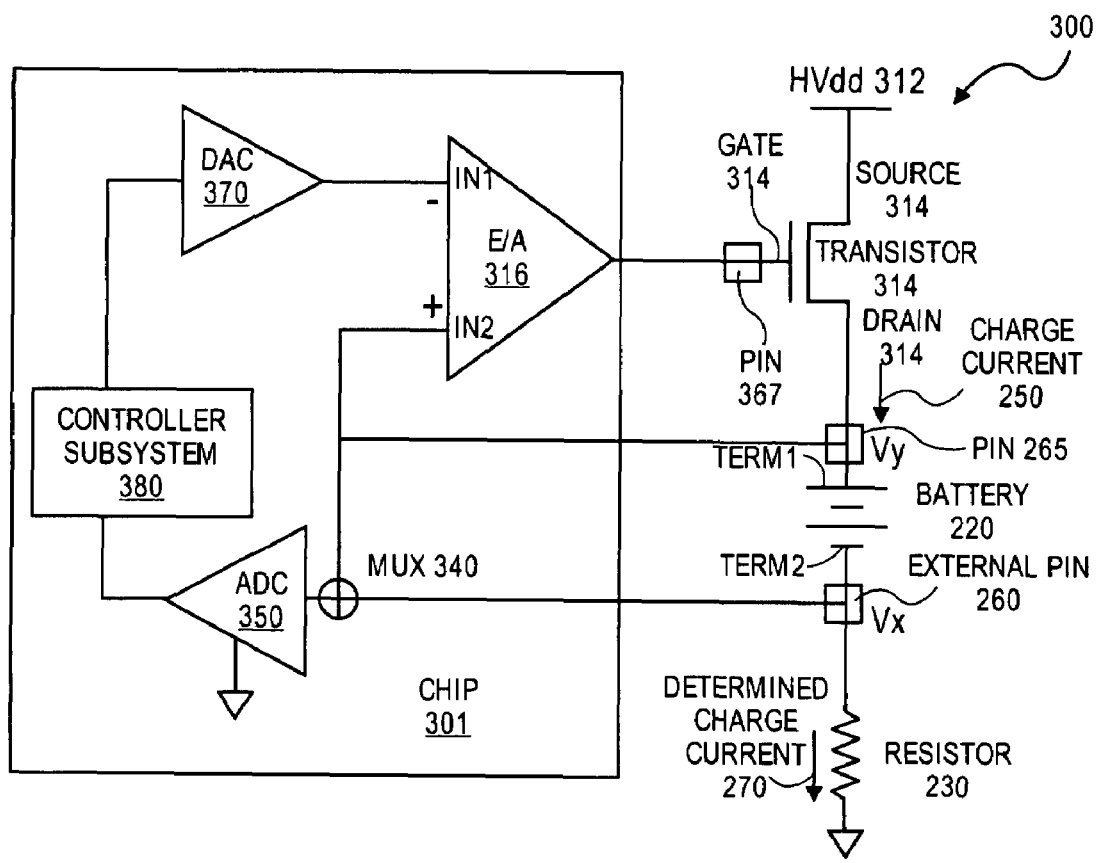
FIG. 3 illustrates one embodiment of a linear control battery charge loop.

FIG. 3 illustrates one embodiment of a linear control battery charge loop. FIG. 3 shows loop 300, for example, a loop to provide a functionality similar to that of loop 200 and/or process 100, but according to a linear control loop, and the like. FIG. 3 shows loop 300 including voltage source HVdd 312 coupled to source (S) 314 of transistor 314, and drain (D) 314 of the transistor coupled to terminal TERM 1 of battery 220. According to one embodiment, source D 314 is coupled to external pin 365, which in turn is coupled to terminal TERM 1. Terminal TERM 2 of battery 220 is coupled to resistor 230 and multiplexer (MUX) 340. According to embodiments, terminal TERM 2 is coupled to pin 260, which is in turn coupled to resistor 230 and/or multiplexer MUX 340.

Also, D 314 is also coupled to MUX 340 and non-inverted input, IN2, of error amplifier (E/A) 316. The output of MUX 340 is input to analog to digital converter (ADC) 350. The output of ADC 350 may be received by controller sub-system 380, for example, by firmware and/or a software program of controller sub-system 380. Controller sub-system 380 is also coupled to digital to analog converter (DAC) 370, for example, to provide output and/or control to DAC 370. The output of DAC 370 is provided to inverting input IN1 of error amplifier E/A 316. The output of E/A 316 is coupled to gate (G) 314 of transistor 314, for example, through pin 367. For example, controller sub-system 380 may be a control sub-system of a microcontroller or of a programmable system on a chip device. Specifically, FIG. 3 shows controller sub-system 380, E/A 316, MUX 340, DAC 370, and ADC 350 as part of chip 301, which may be a single MCU or a single programmable system on a chip device. In some embodiments, resistor 230, battery 220, transistor 314, and/or HVdd 312 may be "external" to chip 301.

Transistor 314 may be used to set, adjust, or shut down current 250 (and/or charge voltage Vx). For example, in some embodiments, source HVdd 312 and transistor 314 may perform some or all of the functions of current source 210. Specifically, transistor 314 may be operated according to the output of E/A 316 applied to gate G 314. In some embodiments, transistor 314 may be a P-type metal oxide semiconductor field effect transmitter (P-type MOSFET or "PFET").

Error amplifier E/A 316 may be an operational amplifier, for example, an operational amplifier having infinite or substantially infinite gain (e.g., in theory). E/A 316 may also be described as a differential amplifier or comparator, for example, to provide an output that is an infinite gain multiplied by the difference between non-inverting input IN2 and inverting input IN1. In some embodiments, error amplifier 316 is a folded cascode type with a zero current, power down feature. Non-inverting input IN2 of E/A 316 may receive a signal equal or proportional to the voltage $V_Y$ at pin 365, for example, the voltage between battery 220 (e.g., between pin 365 and/or terminal TERM 1) and ground.

On the other hand, inverting input IN1 may receive the output of DAC 370, for example, by receiving a voltage level or signal received from controller sub-system 380. Controller sub-system 380 may compare voltage $V_x$ or current 270 to a predetermined battery charge current and/or an over-current threshold signal or level, and then output or send a voltage level or signal to input IN1 and forcing the same voltage level at Vy. For example, controller sub-system 380 may measure or read the signal or voltage at $V_x$ to measuring current 270, by dividing $V_x$ by the resistance value of resistor 230. In some embodiments, ADC 350 may receive the voltage at pin 260 or voltage $V_x$, for example, the voltage between resistor 230 and ground to determine current 270. Thus, controller sub-system 380 may determine current 270 by measuring voltage $V_x$ using ADC 350.

Thus, controller sub-system 380 may include a comparator to compare current 270 with the charge current threshold and another comparator to compare current 270 with the over-current threshold. For example, where transistor 314 is a PFET, when, current 270 is less than the charge current threshold (e.g., less than LTH), controller sub-system 380 may adjust or increase the signal to DAC 370 to increase the output of DAC 370 to cause the output of E/A 316 to decrease (e.g., increasing the biasing voltage for transistor 314), thus increasing current 250. For example, the current flowing through PFET transistor 314 will increase as the voltage at gate 314 decreases or becomes more negative. Alternatively, when current 270 is greater than the charge current threshold (e.g., greater than UTH), controller sub-system 380 may output a signal to cause DAC 370 to decrease the input at IN1 thus causing E/A 316 and transistor 314 (e.g., by decreasing the biasing voltage for transistor 314) to decrease the current at current 250. In some embodiments, where current 270 is greater than or exceeds the over-current threshold (e.g., greater than OCT), controller sub-system 380 may send a shut down signal to E/A 316 to cause transistor 314 to shut off or create an open circuit between source HVdd 312 and battery 220, for example, to discontinue or shut down current 250. Specifically, controller sub-system 380 may send digital signals to DAC 370 which are then converted to analog signals by DAC 370 and provided at input IN1 of E/A 316 to control transistor 314 to set the battery charge current and/or shut down the battery charge current in an over-current condition. It can be appreciated that a similar concept as described herein for using a PFET can be applied using and NFET such as by reversing the inverted and non-inverting inputs to E/A 316.

In some embodiments, controller sub-system 380 may send a programmed increase or decrease in the signal to DAC 370 equal to or proportional to a difference between the determined current 270 and both: a) a predetermined battery charge current threshold value and b) an over-current threshold value. Thus, if determined current 270 is an amount of current less than a predetermined battery charge current threshold value, controller sub-system 380 may send a signal to DAC 370 to cause the input at IN1 to increase so that the output of E/A 316 received at gate G 314 causes transistor 314 to increase the amount of current at current 270. Alternatively, if determined current 270 is an amount of current greater than the predetermined battery charge current threshold value, controller sub-system 380 may send a signal to DAC 370 to cause the signal at input IN1 to decrease so that the output of E/A 316 received at G 314 causes transistor 314 to reduce or limit the amount of current at current 270. In some embodiments, where determined current 270 is an amount of current greater than an over-current threshold value, controller sub-system 380 may send a shut down signal to E/A 316 to cause the signal at input IN1 to decrease to cause transistor 314 to shut off, discontinue or open circuit the voltage from source HVdd 312 passed through the transistor, and thus discontinuing or shut off any amount of current at current 250.

In some embodiments, voltage $V_Y$ is provided to MUX 340, for example to be converted by ADC 350 and received by controller sub-system 380. This embodiment is optional and may be omitted. For example, voltage $V_Y$ may be sensed or measured by ADC 350 and/or controller sub-system 380 to determine whether or not the voltage across battery 220 exceeds a voltage threshold for charging battery 220. Where voltage $V_Y$ exceeds a threshold for charging battery 220, transistor 314 may be shut down, such as described above for an over-current condition. In this case however, the condition may be described as an over voltage condition for the battery. Moreover, a measured voltage at voltage $V_Y$ may be compared to a measured voltage at voltage $V_X$ to determine the voltage across the battery. For instance, for a desired voltage drop across the battery of 4.25 volts, the threshold for voltage $V_Y$ may be 4.35 volts, where voltage $V_X$ is 0.1 volts. Thus, if a measured voltage at voltage $V_Y$ is greater than 4.35 volts, controller sub-system 380 may send a signal to DAC 370 to cause the signal at gate G 314 to drop below the threshold voltage of transistor 314 to shut off the voltage from source HVdd 312 passed through the transistor.

Figure 4:
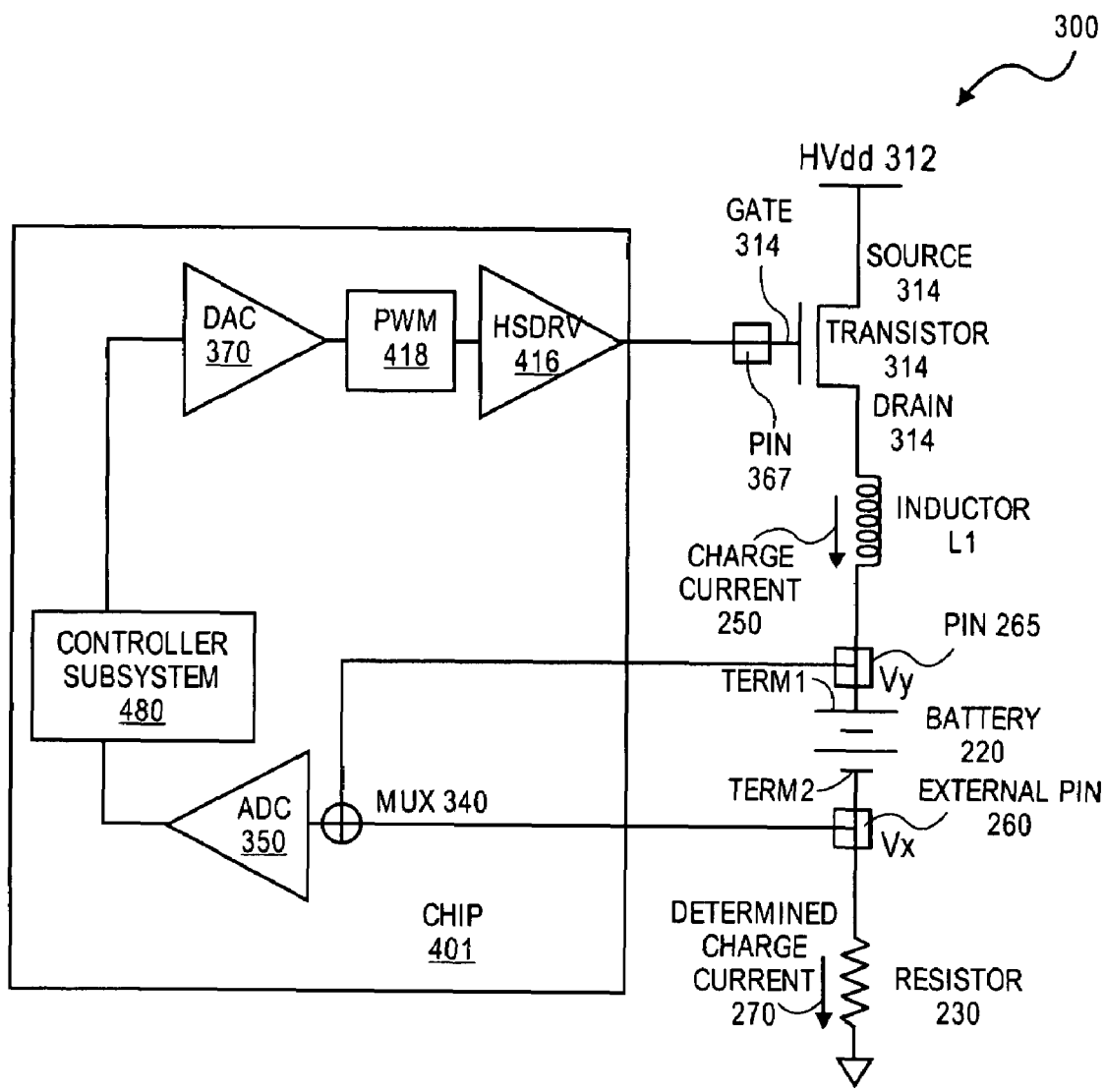
FIG. 4 illustrates one embodiment of a switching control battery charge control loop.

FIG. 4 illustrates one embodiment of a switching control battery charge control loop. FIG. 4 shows loop 400, for example, a loop to provide a functionality similar to that of loop 200, 300 and/or process 100, but according to a switching control loop, and the like. For example, loop 400 may include circuitry, devices, and couplings similar to those of loop 300. Also, loop 400 may include circuitry, devices, and couplings replacing some of those of loop 300 and/or in addition to those of loop 300. Specifically, loop 400 includes inductor L1 between source D 314 and terminal TERM 1 of battery 220. In addition, instead of error amplifier E/A 316, loop 400 uses high-side driver (HSDRV) 416 and pulse width modulator (PWM) 418 to control or provide input to gate G 314. Thus, controller sub-system 480 may be similar to controller sub-system 380, except controller sub-system 480 may provide control signals to DAC 370 to cause DAC 370 to provide an input to PWM 418 to cause HSDRV 416 to output a switching signal to gate G 314 to control transistor 314 different from the linear control of transistor 314 by controller sub-system 380 of block 300. For example, controller sub-system 480 may be a control sub-system of a microcontroller or of a programmable system on a chip device. Specifically, FIG. 4 shows controller sub-system 480, HSDRV 416, PWM 418, MUX 340, DAC 370, and ADC 350 as part of chip 401, which may be a single MCU or a single programmable system on a chip device. In some embodiments, resistor 230, battery 220, transistor 314, inductor L1, and/or HVdd 312 may be "external" to chip 401.

According to embodiments, loops 200, 300, and 400, may perform three functions: voltage feedback control, current feedback control and over-current shutdown. Each loop provides the ability to control the charge voltages $V_Y$ and $V_X$, and the charge current 250 and 270, for example by driving the gate voltage of external transistor 314 between, for example, the positive supply voltage (HVdd 312) and a voltage below the supply voltage. At supply voltages of 5V or less, pin 367 or the GD pin 512 is able to drive to close to ground or zero volts (e.g., HVdd less 5 volts).

For loop 300 and 400, current feedback control may be implemented in a feedback loop using ADC 350 to measure voltage $V_X$ (e.g., at pin 260) to determine current 270. The determined current is compared (using hardware, firmware, and/or software) with a current setting and over-current threshold to determine whether to adjust or shut down the charge current.

Voltage feedback control may be implemented in a fast hardware loop used to set the output voltage (and/or charge voltage $V_Y$. System feedback is derived through the measured voltage $V_Y$ (e.g., at pin 365). This voltage is divided down with an appropriate attenuator setting for internal processing. For linear control loop 300, the divided measured voltage may be fed to the error amplifier, whose reference is a voltage from hardware, which may be controlled by a software algorithm and is based on factors, for example, the charge current and measured voltage. For switching control loop 400, the attenuated voltage may be routed to a comparator that compares against a hardware-based reference voltage. The comparator output may provide a cycle-by-cycle kill signal to PWM 418, to end the charging portion of the cycle whenever the $V_Y$ voltage crosses the target threshold corresponding to the charge current threshold.

Figure 5:
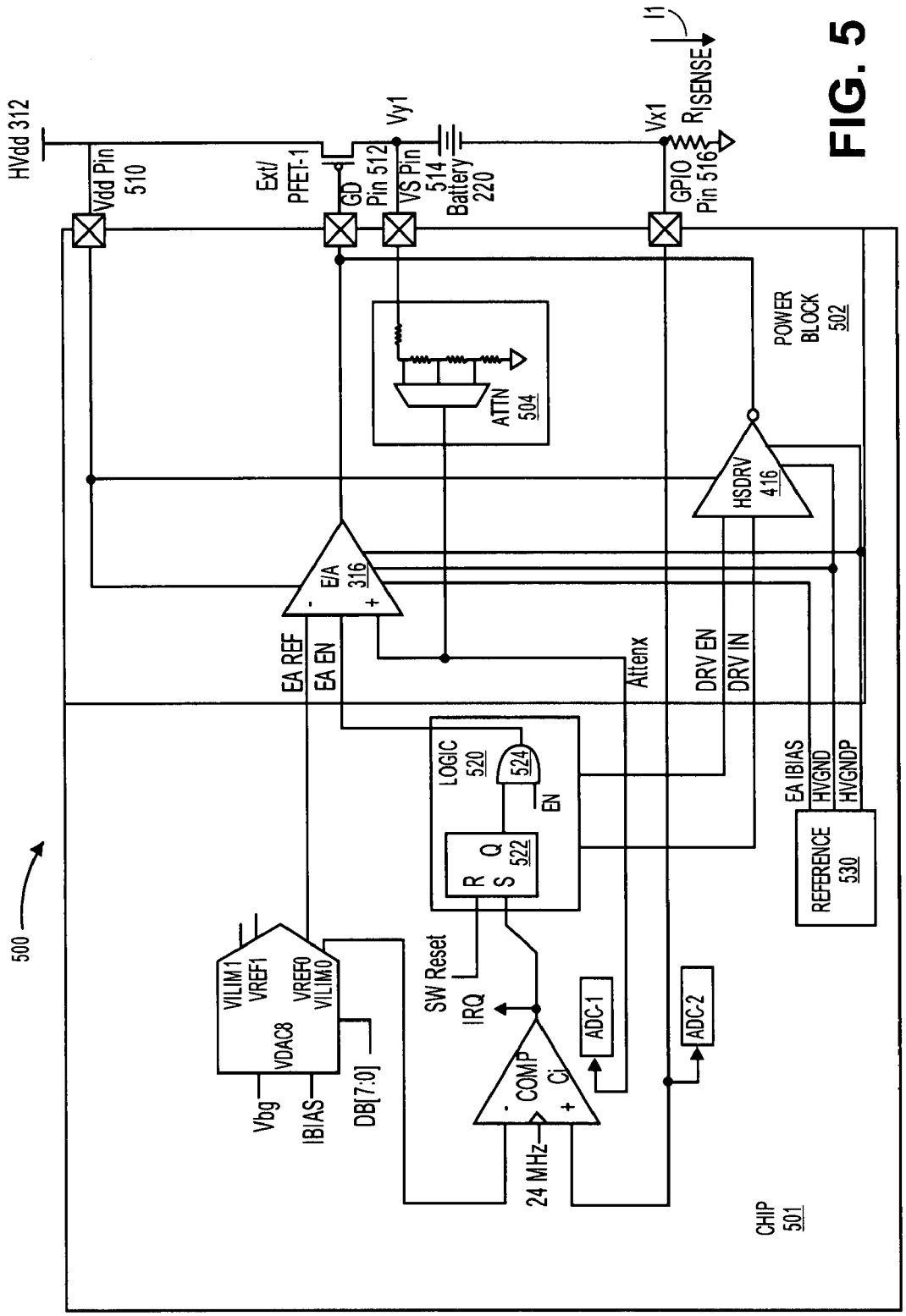
FIG. 5 illustrates one embodiment of a linear control configuration for a battery charger.
Figure 6:
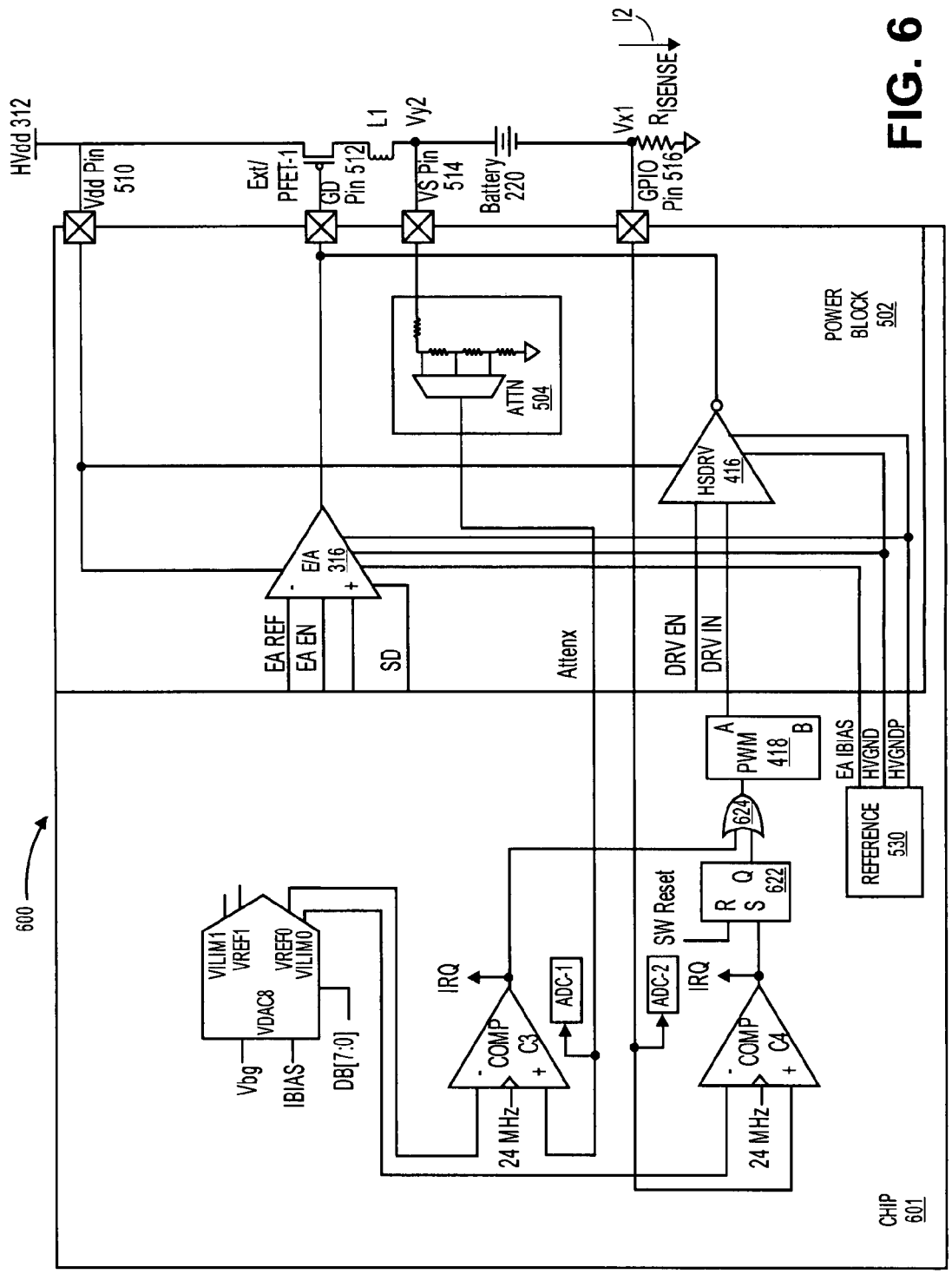
FIG. 6 illustrates one embodiment of a switching control configuration for a battery charger.

FIG. 5 illustrates one embodiment of a linear control configuration for a battery charger. Also, FIG. 6 illustrates one embodiment of a switching control configuration for a battery charger. Specifically, FIGS. 5 and 6 illustrate embodiments of linear control configuration 500 and switching control configuration 600, respectively, for a battery charger. FIGS. 5 and 6 show power block 502, which may be, for example, part or a portion of a programmable system on a chip device. The power block may be configured into a linear control loop as shown in FIG. 5 or into a switching control loop as shown in FIG. 6. The power blocks may be used in conjunction with (e.g., configured using) other analog and digital resources shown to the left of the power blocks in FIGS. 5 and 6. Such other analog and digital resources may include one or more comparators, references, pulse width modulators (PWMs), high-side drivers (HSDRVs), voltage digital-to-analog converters (VDACs), analog-to-digital converters (ADCs), and the like.

For example, configurations 500 and 600 may include chips 501 and 601 respectively, and may each include a controller sub-system (not shown) of a microcontroller or of a programmable system on a chip device (e.g., on chips 501 and 601). Specifically, chip 501 and 601 may both be the same microcontroller or programmable system on a chip device (e.g., hardware), configured or programmed differently, as shown. Chips 501 and 601 include power block 502 having E/A 316, attenuator (ATTN) 504, and HSDRV 416. Power block 502 also includes external contacts or pins (e.g., for electrically soldering or coupling external devices to) voltage source or bias (Vdd) pin 510, general purpose input output (GPIO) pin 516, gate drive (GD) pin 512, and voltage sense (VS) pin 514. Power block 502 may be the same power block, sub-system or portion of a microcontroller or programmable system on a chip device (e.g., hardware), configured or programmed differently, as shown for configuration 500 and 600, Chip 501 also includes reference block (REFERENCE) 530, logic 520, flip-flop 522, AND gate 524, comparator (COMP) C1, ADC 1 and 2, and VDAC 8. Chip 601 also includes REFERENCE 530, PWM 418, flip-flop 622, OR gate 624, comparator COMP C3, comparator COMP C4, ADC 1 and 2, and VDAC 8. Configuration 600 also includes inductor L1 between the source of PFET 1 and a terminal of battery 220 (e.g., at voltage $V_{Y2}$). In some embodiments, resistor 230, battery 220, PFET 1, inductor L1, and/or HVdd 312 may be "external" to chip 501 or 601.

ADC 1 and ADC 2 may be voltages (e.g., measured between the node or pin the ADC is coupled to and ground or another reference voltage) that get analog-to-digital converted by one or more ADCs. For instance, the nodes marked with ADC 1 and ADC 2 may be voltages that get multiplexed (e.g., see MUX 340 of FIGS. 3-4) to a single ADC. Firmware and/or other processing (e.g., software running on a processor) of the ADC values may be used as part of some conversion algorithms for converting the voltage to a current or voltage level measurement or output (e.g., output by the ADC or the other processing entity). It should be noted that such analog system circuitry may be included in, and/or spread out within a device (e.g., spread out within a programmable system on a chip). For instance, these external pins are shown on right side of the power blocks in the figures, for example to identify them external pins or contacts to a chip. Battery 220 (or another load) is shown coupled or connected between p-channel field effect transistor (PFET 1) and resistor $R_{ISENSE}$. $R_{ISENSE}$ and controllers for configurations 500 and 600 may be have values, be selected, be predetermined, and/or be programmed similar to resistor 230 and controller 280, 380 and/or 480, respectively, as described above. The battery may also be coupled, connected or attached to a pair of the external pins (e.g., VS pin 514 and a GPIO pin 516).

Configurations 500 and 600 are shown having currents I1 and I2 (e.g., charge currents), respectively, flowing through battery 220 and $R_{ISENSE}$. In either system, the current flowing through the battery and $R_{ISENSE}$ may be equal or substantially equal. Configurations 500 and 600 are also shown having voltage $V_{Y1}$ and $V_{Y2}$, respectively, between battery 220 (e.g., an end or terminal of the battery receiving the charge current) and ground. Moreover, configurations 500 and 600 are also shown having voltage $V_{X1}$ and $V_{X2}$, respectively, between $R_{ISENSE}$ (e.g., an end or terminal of the resistor receiving the charge current) and ground.

In some embodiments of configuration 500, error amplifier (E/A 316) may be used in the linear control loop to drive the external PFET 1. According to embodiments, PFET 1 may be a transistor as described for transistor 314. The reference input received by E/A 316 comes from an output of VDAC 8 controls the voltage $V_{Y1}$ in the servo loop containing E/A 316, PFET 1, and ATTN 504. VDAC 8 may be a DAC, for example, DAC 370, or another appropriate DAC or VDAC for configuration 500 or 600. In some embodiments, the error amplifier E/A 316 is a folded cascode type with a zero current, power down feature; or is another appropriate E/A for configuration 500 or 600. Bias current EA IBIAS and high voltage ground HVGND reference voltage come from reference block REFERENCE 530.

For some embodiments of configuration 500, error amplifier 316 drives the GD pin 512 to or with a voltage between, for example, the HVdd 312 supply voltage and approximately 5V below that supply voltage as needed to control external PFET 1. Amplifier 316 and/or VDAC 8 can be used or controlled (e.g., by a controller sub-system coupled to VDAC 8) to drive the GD pin with an appropriate voltage to cause PFET 1 to shut down (e.g., driving with a voltage less than the threshold voltage magnitude to turn on PFET 1), increase (e.g., increasing the magnitude of the drive voltage), decrease (e.g., decreasing the magnitude of the drive voltage), or maintain (e.g., maintaining or not changing the drive voltage) the charge current level (e.g., current I1) according to the current determined flowing through $R_{ISENSE}$ by ADC 2.

Also, in some embodiments of configuration 500, HSDRV 416 is disabled during linear control. In linear mode, over-current shutdown is determined using COMP C1 feeding into the logic block 520 (e.g., flip-flop 522, and AND gate 524). For example, the output of the AND gate in the logic block is received by the E/A EN (input of E/A 316) to disable the error amp when the over current comparator trips.

In the some embodiments of configuration 600, high-side driver HSDRV 416 is used in the switching control loop of configuration 600 to drive the external PFET 1. The combined metal oxide semiconductor (CMOS) input of driver 416 comes from PWM block 418.

For some embodiments of configuration 600, the HSDRV 416 drives the GD pin 512 digitally between, for example, the voltage of the HVdd 312 supply voltage and approximately 5V below that supply voltage as needed to control external PFET 1 (e.g., to turn the external PFET on or off). For instance, HSDRV 416, PWM 418 and/or VDAC 8 can be used or controlled (e.g., by a controller sub-system coupled to VDAC 8) to drive the GD pin 512 with an appropriate voltage to cause PFET 1 to shut down, increase, or maintain the charge current level (e.g., current I2) according to the current determined flowing through $R_{ISENSE}$ by ADC 2. In some embodiments, the GD pin 512 of configuration 600 is driven with the same voltages as that of configuration 500 to provide control of PFET 1.

In some embodiments of configuration 600, HSDRV 416 can be used to force the output gate drive voltage to the GD pin 512 to the same voltage as that of HVdd 312 during a power down, over-current condition, or when the power block is not being used. In one embodiment, a digital block output (e.g., flip flop 622 and OR gate 624) can be used to drive the HSDRV. Alternatively, a register bit (DRV_IN) can be the source to the HSDRV 416. A control register (DRV_SRC) selects which source is used for the HSDRV 416 data input.

Also, in some embodiments of configuration 600, E/A 316 is disabled during switching control. For switching control, the over-current shutdown is determined using COMP C4 feeding into the logic block (e.g., flip-flop 622, and OR gate 624). For example, the output of the OR gate in the logic block is received by PWM 418 which drives HSDRV 416 to disable HSDRV 416 when the over current comparator trips.

The resistive attenuator ATTN 504 can be used to reduce a voltage going to the error amplifier of configuration 500 or comparator COMP C3 of configuration 600. In some embodiments, for configuration 500 and 600, two register bits may be used to configure the attenuator to a divided-by-4, divide-by-8, divide-by-16 voltage divider, or an open (disable) state. When enabled, these attenuators may draw a small current (e.g., approximately 2.5 µA/volt) from the external circuit. The input to the attenuators may be a high voltage external pin (e.g., VS pin 514) with electro static discharge (ESD) protection.

Power block 502, along with analog and digital resources (e.g., other components of chip 501 or 601), may perform three functions: voltage feedback control, current feedback control and over-current shutdown. Each power block, for configuration 500 and 600, may provide the ability to drive GD pin 512 with error amplifier 316 output, for linear control of configuration 500; or with the HSDRV 416 digital output, for switching control of configuration 600. Both blocks, for configuration 500 and 600, are intended to drive the gate of external PFET 1, and can drive the GD pin between, for example, the positive supply (HVdd 312) voltage and approximately 5V below the supply voltage. At supply voltages of 5V or less, the GD pin is able to drive to a voltage level close to ground (e.g., or zero volts with respect to HVdd). There are several implementation choices for either control mechanism. For example, switching control (e.g., based on configuration 500) may alternatively be done through a low side driver, using a GPIO pin to drive an external NFET (e.g., instead of PFET 1).

Voltage feedback control is implemented in a fast hardware loop used to set the output voltage. System feedback is derived through the measured voltage at the VS pin 514. This voltage may be divided down with an appropriate attenuator (e.g., ATTN 504) setting for internal processing (e.g., by a controller sub-system or MCU). For linear control of configuration 500, the divided measured voltage is fed to the error amplifier 316 in power block 502, whose reference may be a voltage from the VDAC 8. The VDAC 8 voltage may be controlled by a software program or MCU or controller sub-system (e.g., according to comparisons of the voltage with a threshold voltage, which may include an algorithm) and may be based on factors, for example, the charge current and measured voltage. For switching control of configuration 600, the attenuated voltage may be routed to comparator COMP C3 that may compare it against a VDAC 8-based reference voltage. The comparator output provides a cycle-by-cycle kill signal to PWM 418, to end the charging portion of the cycle whenever the voltage measured at VS pin 514 crosses or is greater than the target threshold voltage (e.g., 4.35 volts).

In some embodiments, VDAC 8 provides two 8-bit registers for setting two voltage references used in voltage feedback loops, and provides two 2-bit registers for setting two voltage references used for over-current shutdown. For a linear control loop of configuration 500, the error amplifier 316 in the power block uses a precision voltage reference. The output from the VDAC 8 can be used to provide this reference. A software loop controls the VDAC 8 8-bit registers by monitoring the battery charging current (e.g., current I1 or I2) and voltage (e.g., voltage $V_{X1}$ or $V_{X2}$). The VDAC 8 outputs controlled by the 2-bit registers can be used as a reference for the over-current shutdown.

Current feedback control may be a slow (e.g., 2-3 ms) software loop (e.g., using a software application, controller sub-system and/or MCU) for regulating the system, loop, or controller through or using the determined charging current. Determining or sensing the load or charge current (e.g., current I1 or I2) is done with a single external resistor ($R_{ISENSE}$) in series with battery 220. In this embodiment, the single external resistor has two functions: 1) provide current level feedback to set the current level to charge a battery, and 2) provide current level feedback to monitor the charge current of the battery (i.e., over-current shutdown level). The battery charge current level I1 or I2 is regulated by the current feedback software loop (e.g., by a controller sub-system, not shown, of configurations 500 and 600). The voltage across the resistor (e.g., voltage $V_{X1}$ or $V_{X2}$, for example measured at GPIO pin 516) is routed to and digitized with internal analog-to-digital converter (ADC) 2. Software (e.g., of a controller sub-system or MCU) may monitor the determined charge current with the ADC and continuously adjust the VDAC 8 reference voltages based on the load or charge current determined (e.g., voltage $V_{X1}$ or $V_{X2}$). This procedure may allow the feedback loops to cause a battery to be charged at a constant current.

In some embodiments, depending on a desired charge current or battery type and/or size to be charged, the software may set the charge current level using one of the following equations:

$$I\_charge = (100mV/R_{ISENSE}) \quad (1)$$

$$I\_charge = (50mV/R_{ISENSE}) \quad (2)$$

Wherein a "mV" may represent 0.001 Volts. In some embodiments, a single bit for each channel may be used to choose between the two charging formulas. These bits may be in a control register, software or firmware.

Also, according to embodiments, resistor $R_{ISENSE}$ can either be on the low-side (e.g., coupled between battery 220 and ground) or high side (e.g., coupled between battery 220 and HVdd source 312) of the load. With low-side sensing, a GPIO can be used to route the measured voltage into the ADC. For high side sensing, two power blocks may be used needed to connect both sides of the sense resistor $R_{ISENSE}$ to ADCs through two attenuators. It can be appreciated that a similar concept can be applied to loops 200, 300 and 400.

When the 100 mV formula is selected, the VDAC 8 reference voltage to the error amplifier will decrease (e.g., be decreased by firmware of a MCU or controller sub-system controlling VDAC 8) when the measured voltage (e.g., voltage $V_{X1}$ or $V_{X2}$) is above 100 mV, and will increase when the measured voltage is below 100 mV in order to maintain 100 mV across $R_{ISENSE}$ and a constant charge current. For example, if $R_{ISENSE}$ is chosen to be 0.1 Ohm, the current feedback will keep the charge current at 1 ampere (A).

When the 50 mV formula is selected, the VDAC 8 reference voltage to the error amplifier will decrease (e.g., be decreased by firmware of a MCU or controller subsystem controlling VDAC 8) when the measured voltage (e.g., voltage $V_{X1}$ or $V_{X2}$) is above 50 mV and increase when the measured voltage is below 50 mV in order to maintain 50 mV across $R_{ISENSE}$ and a constant charge current. For example, if $R_{ISENSE}$ is chosen to be 0.1 Ohm, the current feedback will keep the charge current at 0.5 A.

According to embodiments, when the 100 mV formula is selected, the over-current threshold may be when the measured voltage (e.g., voltage $V_{X1}$ or $V_{X2}$) is greater than 150 mV, or the determined charge current is above at 1.5 ampere (A) (e.g., 50 percent above the charge current). Likewise, when the 50 mV formula is selected, the over-current threshold may be when the measured voltage (e.g., voltage $V_{X1}$ or $V_{X2}$) is greater than 70 mV, or the determined charge current is above at 0.7 ampere (A) (e.g., 20 percent above the charge current).

For monitoring the charge current, a hardware loop uses comparator COMP C1 of configuration 500, and COMP C4 of configuration 600, to compare the measured voltage at the resistor ($R_{ISENSE}$) to a reference voltage from the VDAC 8. An over-current shutdown is tripped if the measured voltage (e.g., voltage $V_{X1}$ or $V_{X2}$) is too high (e.g., corresponds to a charge current greater than an over-current threshold). In one embodiment, when an over-current is detected, external PFET 1 is turned off (e.g., current flow through PFET 1 is shut down by the controller sub-system adjusting the reference at VDAC 8) to stop the charging of the battery. The trip voltage may be predetermined, changed, programmed, or adjusted in the following two ways: (1) by predetermining, changing or selecting the value of $R_{ISENSE}$ to adjust voltage $V_{X1}$ or $V_{X2}$ by an amount to cause the desired change in the threshold (which also affects the charge current); and (2) by changing the register setting in the VDAC 8 (e.g., by programming the software or controller sub-system adjusting the reference at VDAC 8).

In some embodiments, battery 220 may not be coupled or attached to the chip and/or external pins. For example, configuration 500 or 600 of FIGS. 5 and 6 may exclude or not yet be attached to a battery (e.g., battery 220 is not coupled or attached to VS pin 514 and GPIO pin 516 of chip 501 and 601). Similarly, loops 200, 300, and 400 may exclude or not yet be attached to a battery (e.g., battery 220 is not coupled or attached to chip 201, 301 and 401 at TERM 1 to pin 265 and at TERM 2 to pin 260).

The method and apparatus described herein may save pins on a programmable system on a chip device and/or may achieve dual functionality from a single resistor, thereby requiring less parts, hardware or components on or off the chip. The software control adds flexibility for use with various battery charging applications, for example for charging various battery types and/or sizes. The method and apparatus described herein may be used in a variety of systems (e.g., cell phones, laptops, PDAs, etc.) that require battery charging.

Embodiments of the present have been illustrated with metal-oxide-semiconductor field-effect-transistor (MOSFET) technology (e.g., PMOS or p-channel MOSFET) for ease of discussion. In some embodiments, other device types (e.g., NMOS and CMOS) and process technologies, for example, Bipolar and BiCMOS, may be used. It should be noted that the circuits described herein may be designed utilizing various voltages.

According to embodiments, loops 200, 300, 400; and configurations 500 and 600 may be described as being under software control, for example the software described for controller sub-systems of those loops and systems, to set the battery charge current and monitor the over-current condition, based on a current level flowing through an external resistor using a sensor, for example an ADC, and by setting a control signal provided to a DAC. In some embodiments, the control signal is related to or determined by comparing the current flowing through the resistor with a charge current threshold value, and by comparing the current level flowing through the resistor with an over-current threshold value.

Moreover, according to embodiments, controller, MCUs, programmable systems on a chip devices, and/or controller sub-systems described herein (e.g., controller sub-system 280, sub-system 380, sub-system 480 and/or controller sub-systems for configurations 500 and 600) may include hardware circuitry and/or software, for example software being executed on a processor. In addition, those controller sub-systems may be sub-systems or portions of a programmable system on a chip device or microcontroller unit (MCU), for example a microcontroller unit controlled, at least in part, by a software application (e.g., a software controlled MCU). The software application may program or control the MCU or controller sub-system according to algorithms, a charge current threshold value, and/or an over-current threshold value (e.g., predetermined values) programmed in the software application. Alternatively, such thresholds may be input to those controllers or controller sub-systems or exist in those controllers or controller sub-systems independent of the software. For example, such thresholds may be proportional to or consider the resistance value of resistor 230 or $R_{ISENSE}$. Moreover, such threshold values may consider or be proportional to the size (e.g., voltage level), type, charge current, and/or over-current threshold for battery 220. It can be appreciated, that "software" herein may be described as instructions contained on a machine accessible and/or readable medium, that when executed cause a machine to perform the functions described as being performed by the software.

According to embodiments, any or all of loops 200, 300, 400; and configurations 500 and 600 may be described as being "systems", "charging systems" and/or "battery charging systems". The embodiments described above have advantages when compared to battery charging system using one sensor and resistor to obtain feedback for setting the charge electrical current level, and another sensor and resistor to obtain feedback to determine if there is an over current condition requiring the charge current be shut down. Such advantages include that the embodiments requires the use of fewer external pins (e.g., contacts) on the device for coupling to the resistors and sensors. Another advantage is that the embodiments may be more easily pre-programmed for a particular "size" battery (e.g., nominal output voltage level of the battery), charging current, and/or over-current threshold thereby, providing additional flexibility. For example, embodiments above can be used to charge various different "size" batteries and/or charging currents by changing the resistance (e.g., impedance value) of the external resistor and changing the value associated with that resistor in the software, a controller sub-system and/or MCU (e.g., updating the predetermined battery charge current threshold value or range in the software, controller sub-system and/or MCU). Moreover, the over-current threshold may remain the same for the various batteries and/or charge currents (e.g., greater than the charge current setting or threshold by the same percent of the charge current setting or threshold). However, regardless or independent of the battery or current, the over-current threshold can be changed by changing that value in the software, controller sub-system and/or MCU (e.g., updating the predetermined over-current threshold value or percentage in the software, controller sub-system and/or MCU).

Specifically, in some embodiments, the resistance of external resistor 230 or $R_{ISENSE}$ may be a chosen, selected, or predetermined value (e.g., changed) based on the desired charge current (e.g., the setting or charge current threshold) and/or battery "size" (e.g., nominal operating voltage) to be charged. Thus, the voltage across the resistor (e.g., $V_X$, $V_{X1}$ or $V_{X2}$) remains the same by changing the resistance of resistor 230 or $R_{ISENSE}$ when a different charge current is used. Moreover, the inputs to E/A 316, or PWM 418 may be scaled using a variable resistor (e.g., see ATTN 504 of FIGS. 5 and 6) and the output of a DAC (e.g., DAC 370 or VDAC 8) be in a predetermined value range that changes based on the desired charge current and/or battery size (e.g., nominal operating voltage) to be charged. Thus, the voltage received by gate G 314 or GD pin 512 remains the same when a different charge current or battery size is used. One advantage of this design is that the same chip or hardware can be used to charge different batteries (e.g., with different charge current and battery voltages).

For example, since controller sub-system 280, sub-system 380, and sub-system 480 can be software controlled, different sizes of batteries can by charged by loops 200, 300, and 400 without changing the chip (e.g., chip 201, 301, or 401) or internal components thereof. A similar concept applies to controller sub-systems for configurations 500 and 600, which can be software controlled so that different sizes of batteries can by charged by those systems without changing the chip (e.g., chip 501 or 601) or internal components thereof. Specifically, for a greater voltage and charge current capable battery than battery 220, a greater voltage HVdd (e.g., larger or greater in voltage level than HVdd 312), greater charge current threshold and smaller value resistor (resistance less than resistor 230 or $R_{ISENSE}$) may be predetermined. Since the software, HVdd and resistor are external to the chip or coupled by external pins, a same chip (e.g., chip 201, 301, 401, 501, or 601) can be assembled with these changes to charge various battery sizes.

In addition, with this design, the over-current threshold may be changed in the software, independent of the battery size. For instance, the over-current threshold percent may be left the same for the various battery sizes. Alternatively, this threshold percentage can be changed in the software, independent of the battery size.

Thus, loops 200, 300, and 400; and configurations 500 and 600 may provide additional flexibility as compared to two resistor systems.

Finally, loop 200, loop 300, loop 400, configuration 500, configuration 600 and/or components (e.g., devices) thereof may be sub-systems or portions of (e.g., realized on), for example, a programmable system on a chip device (e.g., a PSoC® device manufactured by Cypress Semiconductor Corporation of San Jose, Calif.), which may be a microcontroller that allows designers to build very small portable devices and to fit the electronics into a small battery package. Specifically, in some embodiments, controller sub-system 280 of FIG. 2; controller sub-system 380 and E/A 316 of FIG. 3; and/or controller sub-system 480 and HSDRV 416 of FIG. 4 may be sub-systems or portions of a microcontroller and/or of a programmable system on a chip device. Also, block 502, E/A 316, reference 530 (e.g., a reference block), ATTN, HSDRV 416, and a controller of FIG. 5 and/or of FIG. 6 may be sub-systems or portions of a microcontroller and/or of a programmable system on a chip device. According to some embodiments, a microcontroller (or MCU) may be a computer-on-a-chip. It may be a type of microprocessor emphasizing self-sufficiency and cost-effectiveness, in contrast to a general-purpose microprocessor (the kind used in a personal computer).

Although the present invention has been described with reference to specific embodiments, it will be evident that various modifications and changes may be made to these embodiments without departing from the broader spirit and scope of the invention as set forth in the claims. Accordingly, the specification and drawings are to be regarded in an illustrative rather than a restrictive sense.

What is claimed is:

1. An apparatus comprising:
 a battery charger control loop comprising a single external resistor, the loop configured to set a battery charge current of a battery and monitor an over-current condition of the battery.

2. The apparatus of claim 1, wherein the control loop comprises:
 a current sensor to determine the battery charge current flowing through the single external resistor; and
 a controller sub-system coupled to the current sensor, the controller sub-system to set the battery charge current based on the determined battery charge current and to monitor the over-current condition based on the determined battery charge current.

3. The apparatus of claim 2, wherein the control loop further comprises:
 a current source coupled to the controller sub-system, the current source to generate the battery charge current; and
 a transistor coupled to the current source, the transistor to shut down the battery charge current.

4. The apparatus of claim 3, wherein the current sensor comprises an analog-to-digital converter (ADC) to measure the voltage across the single external resistor, wherein the determined battery charge current is based on the measured voltage and the resistive value of the external single resistor, and wherein the controller sub-system comprises an digital-to-analog converter (DAC), the DAC to send a control signal to the current source based on the measured voltage.

5. The apparatus of claim 4, wherein the battery charger control loop is under software control to set the battery charge current and monitor the over-current condition based on a current level flowing through the single external resistor by measuring a voltage level across the single external resistor using an analog-to-digital converter (ADC), and by setting the control signal in the DAC.

6. The apparatus of claim 2, wherein the single external resistor and the current sensor are coupled between a battery and ground to an external contact pin of a chip, and the current sensor is configured to measure a voltage across the single external resistor to determine the battery charge current flowing through the battery.

7. The apparatus of claim 6, further comprising:
 a first comparator to compare the measured voltage to a predetermined battery charge current threshold range; and
 a second comparator to comparator the measured voltage to a predetermined over-current threshold value,
 wherein if the measured voltage is not within the battery charge current threshold range, the controller sub-system adjusts the battery charge voltage, and wherein if the measured voltage exceeds the over-current threshold value, the controller sub-system shuts down the battery charge current.

8. A battery charging system comprising:
 a current source to generate current through a battery;
 a resistor to receive the current from the battery;
 a current sensor coupled to the resistor to determine the current from the battery using the resistor and to output a determined current level; and
 a controller sub-system to receive the output and to set the current through the battery based on the determined current level, and to shut down the current through the battery based on the determined current level.

9. The system of claim 8, wherein the current source, resistor, current sensor and controller sub-system form a feedback loop to control the current generated by the current source based on the determined current flowing through the resistor.

10. The system of claim 9, wherein the feedback loop comprises a controller sub-system of a microcontroller unit (MCU) coupled between the current sensor and the current source to control the current source based on the determined current level.

11. The system of claim 10, wherein the controller sub-system comprises a software controlled controller sub-system coupled between the current sensor and the current source configured to:
 measure a voltage across the resistor using an analog-to-digital converter (ADC), and
 set a digital-to-analog converter (DAC) reference voltage based on the measured voltage to set the current level or to shut down the current level.

12. The system of claim 11, wherein the current source comprises a transistor to shut down, increase, decrease, or maintain the current level, the transistor having a source coupled to a voltage source, a drain coupled to a first terminal of a battery, and a gate coupled to receive a signal based on the reference voltage.

13. The system of claim 12, wherein the resistor is coupled between a second terminal of the battery and ground, wherein the current sensor is coupled between the second terminal, the resistor, and the controller sub-system, and wherein the system further comprises a voltage sensor coupled between the source of the transistor, the first terminal, and the controller sub-system.

14. The system of claim 8, wherein the system is a linear system and wherein the current source comprises a P-type field effect transistor (PFET) having a source coupled to a voltage source, a drain coupled to a first terminal of a battery, wherein the resistor is coupled between a second terminal of the battery and ground, wherein the current sensor comprises an analog-to-digital converter (ADC) coupled between the second terminal and the resistor; and wherein the system further comprises:
- a controller sub-system of a MCU coupled between the current sensor and a DAC;
- a voltage sensor coupled between the first terminal and the controller sub-system; and
- an error amplifier having an inverting input coupled to the DAC, and output coupled to a gate of the PFET, and a non-inverting input coupled to the first terminal.

15. The system of claim 8, wherein the system is a switching system and herein the current source comprises a P-type field effect transistor (PFET) coupled between a voltage source and first terminal of an inductor, and a second terminal of the inductor coupled to a first terminal of a battery, wherein the resistor is coupled between a second terminal of the battery and ground, wherein the current sensor comprises an ADC coupled to the second terminal, and wherein the system further comprises:
- a controller sub-system of a MCU coupled between the current sensor and a DAC;
- a voltage sensor coupled between the first terminal and the controller sub-system;
- a DAC coupled between an output of the controller sub-system and an input of a pulse width modulator (PWM); and
- a high-side driver (HSDRV) coupled between an output of the PWM and a gate of the PFET.

16. A method comprising:
- receiving a charge current determination of a current flowing through a single resistor;
- setting a battery charge current based on the determination; and
- monitoring an over-current condition based on the determination.

17. The method of claim 16, wherein setting comprises maintaining the charge current within a predetermined current range and wherein monitoring comprises determining whether to shut down the charge current.

18. The method of claim 17, wherein maintaining comprises:
- increasing the charge current from a level below the range to a level within the range; and
- decreasing the charge current within the range,
- and wherein determining whether to shut down the charge current comprises determining whether to maintain the charge current below a predetermined over-current threshold or to shut down the charge current.

19. The method of 17, wherein setting comprises:
- comparing the determination with a predetermined charge current threshold;
- increasing the charge current if the determination is below the predetermined charge current threshold; and
- decreasing the charge current if the determination is above the predetermined charge current threshold.

20. The method of 19, wherein monitoring comprises:
- comparing the determination with a predetermined over-current threshold; and
- shutting down the charge current if the determination is above the predetermined over-current threshold.

* * * * *